United States Patent [19]

Bechtel et al.

[11] Patent Number: 5,010,554
[45] Date of Patent: Apr. 23, 1991

[54] ERROR CORRECTION METHOD AND APPARATUS

[75] Inventors: Linda K. Bechtel, Newburyport; Gary D. Martin, North Andover, both of Mass.

[73] Assignee: AT&T Bell Laboratories, Murray Hill, N.J.

[21] Appl. No.: 350,494

[22] Filed: May 12, 1989

[51] Int. Cl.$^5$ .................... G06F 11/10; H03M 13/00
[52] U.S. Cl. .................. 371/37.1; 371/38.1; 371/39.1; 371/37.8
[58] Field of Search ............ 371/37.1, 38.1, 39.1, 371/37.8

[56] References Cited

U.S. PATENT DOCUMENTS

| | | | |
|---|---|---|---|
| 4,020,461 | 4/1977 | Adams et al. | 371/37.1 |
| 4,763,331 | 8/1988 | Matsumoto | 371/37.8 |
| 4,914,660 | 4/1990 | Hirose | 371/37.1 |

OTHER PUBLICATIONS

G. C. Clark, Jr., and J. B. Cain, "Error-Correction Coding For Digital Communications", Plenum Press, N.Y., pp. 167–172.

G. D. Forney, Jr., R. G. Gallager, G. R. Lang, F. M. Longstaff and S. U. Qureshi, "Efficient Modulation for Band-Limited Channels", IEEE Journal on Selected Areas in Communications, vol. SAC-2, No. 5, Sep. 1984, pp. 632–647.

S. I. Sayegh, "A Class of Optimum Block Codes in Signal Space", IEEE Transactions on Communications, vol. Com-34, No. 10, oct. 1986, pp. 1043–1045.

E. L. Cusack (UK), "Error Control Codes for QAM Signalling", Electronics Letters, 19th Jan. 1984, vol. 20, No. 2, pp. 62–63.

G. Ungerboeck, "Channel Coding with Multilevel-/Phase Signals", IEEE Transactions on Information Theory, vol. IT-28, No. 1, Jan. 1982, pp. 55–67.

L. F. Wei, "Trellis-Coded Modulation with Multidimensional Constellations", IEEE Transactions on Information Theory, vol. IT-33, No. 4, Jul. 1987, pp. 483–501.

*Primary Examiner*—Jerry Smith
*Assistant Examiner*—Phung My Chung

[57] ABSTRACT

For forward error correction, the least significant bit of each multibit symbol is encoded before transmission according to a block code that has an over-all parity bit. Since even syndromes can be produced by only an even number of errors and odd syndromes by an odd number of errors, a Chase decoder at the receiver considers either all double errors or all single errors and all triple errors that include the least reliable symbol in making the corrections to arrive at the most likely transmitted sequence.

20 Claims, 4 Drawing Sheets

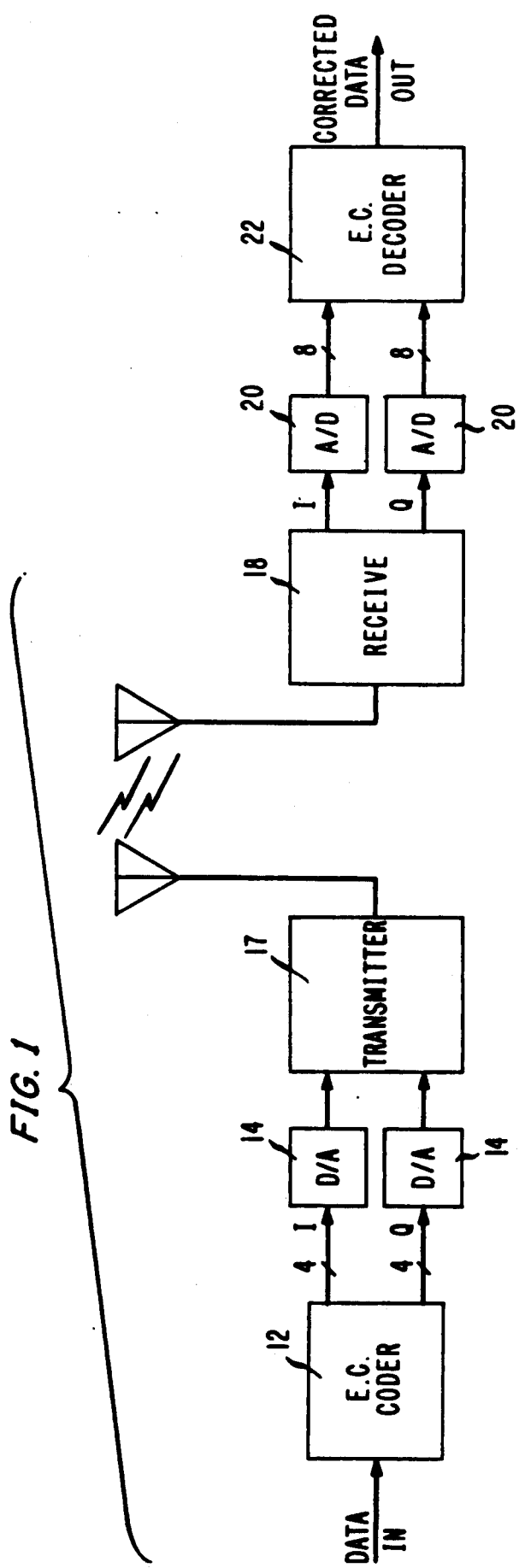
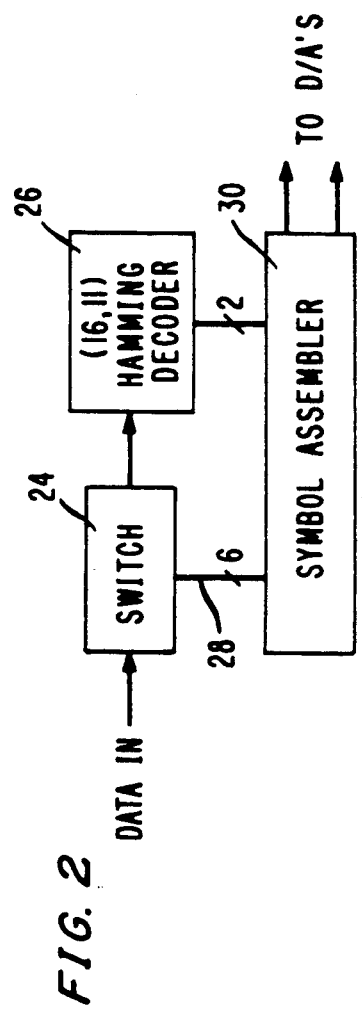
FIG. 1
FIG. 2

FIG. 4

HAMMING (16,11) GENERATOR

```
1 1 1 1 0 1 0 1 1 0 0 1 0 0 0 0
0 1 1 1 1 0 1 0 1 1 0 0 1 0 0 0
0 0 1 1 1 1 0 1 0 1 1 0 0 1 0 0
1 1 1 0 1 0 1 1 0 0 1 0 0 0 1 0
1 1 1 1 1 1 1 1 1 1 1 1 1 1 1 1
```
LOCATION ─────────────────────────────
```
o — o — o — o — o — o — o — o —
o o — — o o — — o o — — o o — —
o o o o — — — — o o o o — — — —
o o o o o o o o — — — — — — — —
```

ERROR CORRECTION METHOD AND APPARATUS

TECHNICAL FIELD

This invention is in the field of digital transmission, and more specifically, the area of error correction using block codes.

BACKGROUND OF THE INVENTION

In digital transmission systems, the accepted measure of quality is the error rate, i.e., the proportion of received bits that are different from those transmitted. While the error rate is affected by virtually all aspects of the system design, it is also possible to address it directly with the use of error correction. A substantial improvement in error rate due to error correction can ease requirements on other system features such as amplifiers, equalizers, and span lengths; or alternatively, it can extend the state of the art transmission performance in terms of bits per second.

Known error correction systems require the transmission of information in addition to the data, or "overhead" information, and some kind of calculation using the received data and overhead information to generate the corrected data. The factors that can be traded off one against another and still provide effective error correction are the additional bandwidth/time required for transmission; the amount of time needed to perform the calculations; and the complexity and cost of the equipment.

Where bandwidth/time is a very high priority consideration, such as, for example, in digital radio systems, the amount of overhead information must be kept to a minimum.

A very effective known error correcting system uses multi-level transmission, coding of the most sensitive bits of each transmitted symbol according to a block code such as a Hamming code and a maximum likelihood decoder. The Hamming code comprises a series of data bits followed by several check bits. The check bits reflect the parity of various combinations of data bits. A syndrome is derived for each coded data block by recalculating the check bits from the received data bits according to the Hamming code and comparing them with the received check bits by modulo-two addition. If the syndrome is not zero, the received code word comprising the received data bits and check bits is not valid. The maximum likelihood decoder considers all of the valid code words that might have been transmitted that, with the received code word, would produce the particular syndrome. It calculates the euclidean distance between each valid code word and the actual amplitudes of the received symbol sequence, and selects the closest as the corrected word. The problem is that for long codes with a relatively low overhead the number of different valid code words that could produce each syndrome becomes enormous.

The Chase decoder assumes a subset of valid code words that would produce each syndrome, and selects the closest. Known Chase algorithms however leave something to be desired. If only single symbol errors are considered, that is, valid code words that differ from the received code word in only one symbol, the over-all error correction is not very effective. When multiple symbol error patterns are considered, the amount of calculation rapidly expands to the point where it cannot be completed in real time on a high speed transmission system.

An object of this invention is an error correction system that can produce effective error correction with a high speed data throughput using very low overhead.

SUMMARY OF THE INVENTION

A data signal for transmission is encoded according to a block code which has an over-all parity bit. At the receiver, analog-to-digital converting means converts the received symbols into hard bits representing the received data and soft bits representing additional less significant bits. A reliability metric indicative of the proximity of the actual received symbol to the slicing level between hard bits is generated for each received symbol from its soft bits, and the least reliable symbol is identified. The block syndrome is calculated from the coded hard bits. Several error pattern candidates, each identifying a symbol or combination of symbols, that if corrected, would produce a valid code word are retrieved in response to each non-zero syndrome. For each non-zero even syndrome, the error pattern candidates comprise the complete set of double errors, for each odd syndrome, the candidates comprise the single error and the complete set of triple errors that each include the least reliable symbol. The reliability metrics of the implicated symbols are evaluated for each retrieved error pattern candidate, and the implicated symbols of one candidate are corrected to produce the valid code word closest to the received symbol values.

BRIEF DESCRIPTION OF THE DRAWING

FIG. 1 is a block diagram of digital radio transmission system which could embody the invention.

FIG. 2 is a block diagram of a block coder useful in implementing the invention.

FIG. 4 is a syndrome generator table for the Hamming (16,11) code, useful in implementing the invention.

DETAILED DESCRIPTION

Figure 3:
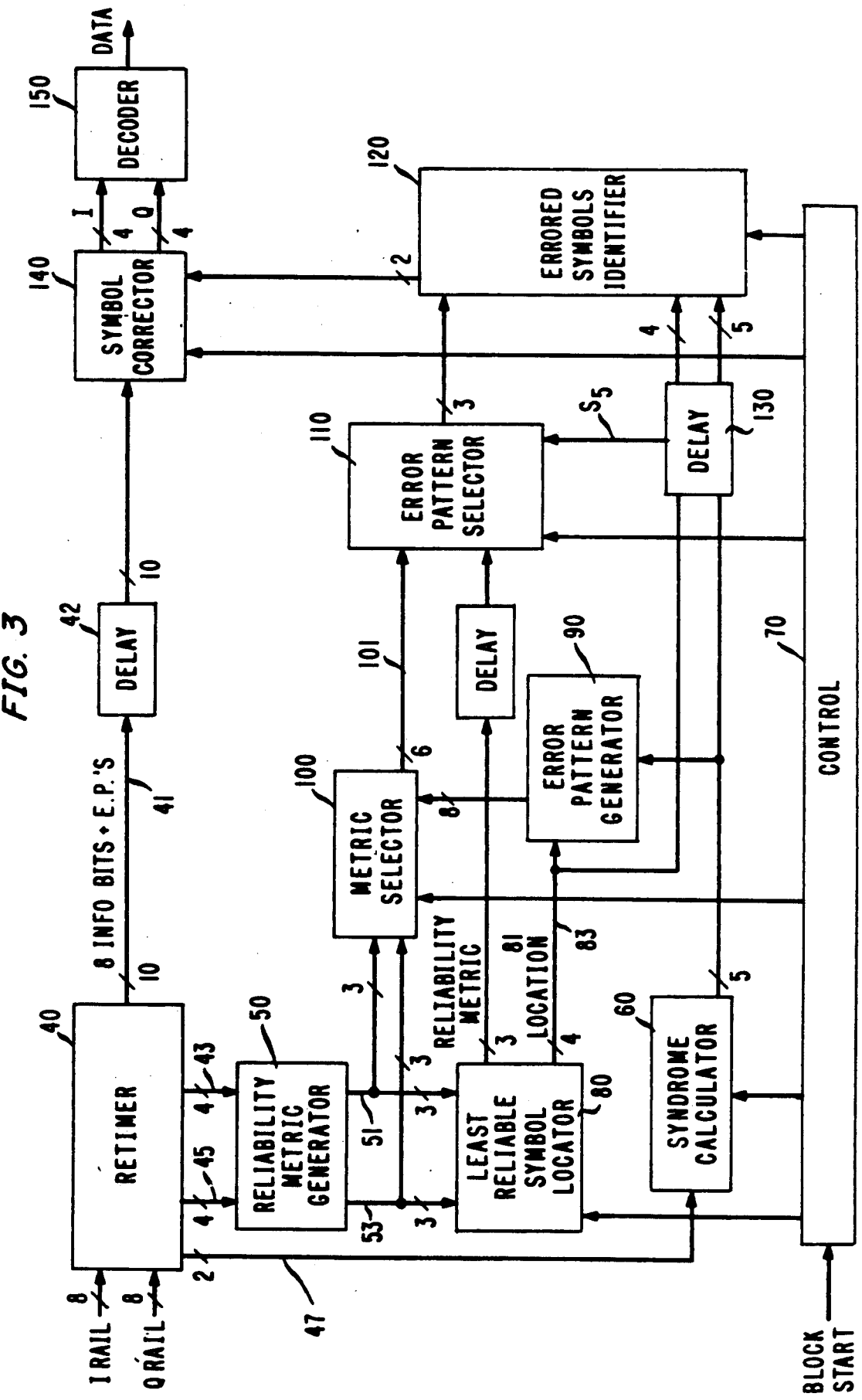
FIG. 3 is a block diagram of a block decoder embodying the invention.

In the error correcting digital radio transmission system of FIG. 1, the input data stream is first encoded in an error correcting encoder 12. Encoder 12 may generate blocks of multibit symbols on two output rails I and Q. The least significant bit of each symbol is encoded according to a block code, the last bit of which, according to the invention, is an overall parity bit. Block framing information is included, and may be in the form of a repeated pattern typical of other framing information.

A digital-to-analog converter 14 in each rail converts the multibit symbols to discrete analog levels for quadrature-amplitude modulation (QAM). The embodiment shown indicates that the I and Q rails are each 4-bit busses, implying 4-bit symbols for conversion to 16 discrete levels and 256 QAM. Obviously, the invention is not limited to such a choice, other QAM values requiring a different number of levels could also be used. In fact, the multilevel signal need not be quadrature modulated; other multi-level transmission formats may be used as well as other media in addition to digital radio. Even binary data encoded according to a block code having an over-all parity bit can be effectively corrected by our invention. A transmitter 17, in the embodiment provides the necessary modulation and filtering to transmit a 256 QAM radio according to well known techniques.

Receiver 18 receives the 256 QAM signal, provides the necessary demodulation, filtering, equalization, timing recovery, etc., known in the art to produce the multilevel analog signals on I and Q rails. A pair of analog-to-digital converters (A/D) 20 each produce an 8-bit word in response to each discrete level received. While 8-bit resolution in the A/D's is not necessary, as will later be seen the A/D's must produce at least 2 bit resolution greater than the number of bits in a symbol. The four most significant of these eight bits are translated into the received data and overhead bits and are termed "hard" bits. The four remaining bits merely reflect the accuracy of the received symbols, and are termed "soft" bits.

An error correction decoder 22 recovers the one code bit within the four received hard bits, and the four soft bits from each symbol, and the block start indication. From this information it determines the most likely error pattern from among a select set of candidates according to the invention, makes the corrections and outputs a corrected data stream.

A block diagram of an error correction encoder that can be used with the invention is shown in FIG. 2, to which we now direct your attention. The data to be reliably transmitted is divided into two paths by a programmed switch 24. Bits to be encoded may be fed to a Hamming encoder 26, the remaining bits may be output on an output 28 to a symbol assembler 30. The Hamming encoder may output two code bits per baud to assembler 30 where they are joined with the uncoded bits to form symbols; the symbols are then converted to discrete analog levels for transmission.

Since encoder 26 is identified as a Hamming (16,11) coder, it receives eleven data bits per block, adds five check bits, and outputs the sixteen bits, all of which we call coded bits. Identifying each of the eleven data bits as $d_n$, and the check bits as $c_n$, this Hamming code generates the check bits as follows:

$c_1 = d_1 + d_2 + d_3 30 \, d_4 + d_6 + d_8 + d_9$ $c_2 = d_2 + d_3 + d_4 + d_5 + d_7 + d_9 + d_{10}$ $c_3 = d_3 + d_4 + d_5 + d_6 + d_8 + d_{10} + d_{11}$ $c_4 = d_1 + d_2 + d_3 + d_7 + d_8 + d_{11}$ $c_5 = d_1 + d_2 + d_3 + d_4 + d_5 + d_6 + d_7 + d_8 + d_9 + d_{10} + d_{11} + c_1 + c_2 + c_3 + c_4.$

Switch 24, therefore, must pick eleven bits from the data stream for encoding each block. Since with an effective multilevel transmission format, the likelihood of an error being more than one level in magnitude is minuscule, only the least significant bit of each symbol need be encoded. In a 256 QAM transmission system, which employs 16-level symbols determined by four bits, the three most significant bits of each symbol need not be encoded. Forty-eight bits, therefore, are directed to assembler 30 at the rate of six bits per baud. The two coded bits become the respective least significant bits of the two symbols per baud.

The algorithm by which switch 24 selects the eleven bits to be encoded from the total of fifty-nine data bits per block is not important as long as the decoder in the receiver operates consistently to replace the data bits in their proper sequence and eventually discard the check bits. One simple algorithm which causes minimum delay is to select the first bit of each block and every fourth bit thereafter until all eleven are selected.

The output code word then becomes $d_1, d_2, d_3, d_4, d_5, d_6, d_7, d_8, d_9, d_{10}, d_{11}, c_1, c_2, c_3, c_4, c_5$. By restricting the error correcting coding to only the least significant bits of each transmitted symbol, we are greatly reducing the number of overhead bits that must be transmitted. In this case we add only 5 overhead bits to 59 data bits to make a block of 64 transmitted bits. With multilevel signal transmission, however, we are not significantly affecting the effectiveness of the error correction.

It should be noted that our invention is not limited to the use of the Hamming (16,11) code. The choice of any block code which has an over-all parity bit suffices to enable an important advantage of the invention. With all such codes, an odd syndrome, that is, a syndrome ending in 1, can be generated by only an odd number of errors; an even syndrome can be generated by only an even number or no errors.

By using a block code which has an over-all parity bit, therefore, we significantly reduce the number of candidate error patterns that must be considered for each syndrome; error patterns that contain both odd and even numbers of errors are never candidates for the same syndrome. We are thus able to consider all of the most likely single, double and triple errors according the invention.

A block diagram of an error correcting decoder that can be used as decoder 22 in the 256 QAM system of FIG. 1 to perform the invention is shown in FIG. 3.

In the decoder, the 8-bit I and Q rail outputs from A/D converters 20 may be fed into a retimer 40, which synchronizes the distribution of portions of the 16 input bits per baud. Ten bits, which include from each rail the four information bits plus the most significant soft bit, known as the error polarity (E.P.) bit, are fed via output 41 to a delay device 42. The four soft bits from the I and Q rails are fed to a reliability metric generator via outputs 43 and 45 respectively, and the two code bits, which are the least significant received information bits are fed via an output 47 to a syndrome calculator 60.

Reliability metric generator 50 converts the soft bit information from each rail into a binary number indicative of the distance between the actual received analog value of the symbol and the indicated digital symbol. When straight binary A/D conversion is used, this can be accomplished simply by stripping off the EP bit and, only when the EP bit is 1, inverting each of the remaining three bits. The lower the binary number of this derived metric, therefore, the closer to the slicing level and the less reliable the received symbol. The 3-bit reliability metrics for the symbols received on the two rails are output from metric generator 50 on outputs 51 and 53, respectively.

Syndrome calculator 60 calculates the syndrome in the well known manner by recalculating the check bits from the received coded data bits and modulo-two adding them to the received check bits. In the case of the Hamming (16,11) code, there are five check bits, hence five syndrome bits. This function requires the identification of the start of each block, which may be received via a control circuit 70.

While the syndrome is being calculated, the least reliable symbol may be located by a least reliable symbol locator 80. This device may compare the two metrics received each baud from metric generator 50 and hold the lower metric. A second comparator may compare each such held metric with the succeeding one and again store the lower, keeping track of the baud from which it originated. When the metrics from all eight bauds of a code block have been received, least reliable symbol locator 80 outputs the last stored metric on a 3-bit bus 81 and its location, baud and rail, for output on a 4-bit bus 83. Since the process must be repeated for each block, a block start indication is received from control-circuit 70. Alternatively, individual comparators for each input bus may make the baud-by-baud comparison, with the final comparison being between the two stored metrics.

The candidate error patterns, limited according to the invention, may be retrieved from an error pattern generator 90. Generator 90 may advantageously be a programmed read-only memory (PROM), addressed by the five syndrome bits from syndrome calculator 60 and the four location bits from the least reliable symbol locator output 83. Stored at each of the $2^9$ addresses can be two 4-bit words representing the locations of up to two errors of a candidate error pattern.

When the Hamming (16,11) code is used, a maximum of eight candidate error patterns need be produced for each address, requiring only 32,768 bits of PROM storage. In fact, because some syndromes are generated by a more restricted set of errors, even less memory would be required if additional logic were added. The low cost of this modest amount of memory, however, would seem to favor this simple approach requiring slightly more memory. With the Hamming (16,11) code, each syndrome that is not all zeros, but ends in zero, that is, each non-zero, even syndrome can be generated by only eight double error patterns, no single error patterns and no triple error patterns. The PROM of generator 90 can therefore have the same eight 8-bit words stored at each of the sixteen addresses that represent one even, non-zero syndrome. There are fifteen such syndromes, thus only fifteen sets of eight 2-symbol error patterns. The all zero syndrome, of course, represents no correctable errors in the reception. In this embodiment, the words stored at these 16 addresses are of no significance since a later stage of the decoder recognizes the all-zero syndrome.

For each of the sixteen possible odd syndromes there is exactly one single error and seven triple errors wherein one of the triple errors is a specific symbol. By adding the location of the least reliable symbol to the syndrome in addressing generator 90, therefore, we can limit triple-error candidates to those seven that include the least reliable symbol. If we store the location of the single error candidate as the first output word at each of the sixteen odd-syndrome addresses, we can make use of that information later. In addition, since we know that the least reliable symbol is included in each candidate triple error pattern, we need store only the locations of the other two symbols. At each of the sixteen possible least reliable symbol addresses for every odd syndrome, therefore, we store seven additional 8-bit words.

The particular error patterns to be stored can be generated from the generator matrix related to each code. The generator matrix for the Hamming (16,11) code is given in FIG. 4, to which we now refer.

There are sixteen columns of five bits each. Each column represents a 5-bit syndrome; its location is the same as that of a single errored symbol that will generate the syndrome. A syndrome 11111, therefore could be caused by an error in the third symbol (location 0010). This location, that is, the 4-bit word 0010 is the first word stored in all of the locations addressed by the syndrome 11111.

The generator matrix can also be used to determine multiple-error patterns. Combination of columns which, when modulo-two added together generate a particular syndrome, identify the respective locations of combinations of errored symbols which generate the syndrome. Since the second column 11011, the sixth column 10101 and the twelfth column 10001 modulo-two add to the syndrome 11111, that triple error pattern will also be identified with the syndrome. In order to make the number of candidate error patterns manageable, according to the invention, however, it will only be stored at the three addresses represented by the syndrome and the location of the three respective symbols. The 8-bit word 00010101 (made up of locations two and six) will be another one of the eight words stored at the address 111111011 (made up of the syndrome and least reliable symbol location twelve). Similarly, the word 00011011 (location two and twelve) will be one of the eight words stored at address 111110101 (syndrome plus least reliable symbol location six), and word 01011011 (7,12) will be stored at location 111110001 (syndrome, 2). Since there can be no single-error symbol included in a triple-error pattern, the case in which the single error candidate is also the least reliable symbol is special. There are no triple error candidates that include the least reliable symbol for storage. It has been found convenient to store the location of the single error, least reliable symbol, repeated once to form the 8-bit word for all eight error-pattern candidates. By example, at the address 111110010 (syndrome 11111, location 3) all eight stored words would be 0010010.

The eight 8-bit words representing the locations of the two errored symbols for each of the eight respective double-error patterns that generate each even syndrome can be derived from the generator in a similar way. For example, consider an error in both the third symbol (location 0010) and the fifth symbol (location 0100). Modulo-two addition of the third generator matrix column (11111) and the fifth column (01111) yields the syndrome 10000. One of the eight words stored at each address starting with 10000, therefore, is 00100100. Since quadruple and higher order patterns are being neglected, this embodiment using the Hamming (16,11) code need store only eight words for each even syndrome.

In order to determine from among the selected candidate error patterns, the one most likely pattern, we need the reliability metric associated with each suspect symbol. A metric selector 100 for this purpose may take the form of one or more six-parallel-bit addressable shift registers at least eight bits long. The six bits representing the reliability metrics of the two symbols each baud from outputs 51 and 53, respectively, of metric generator 50 are stored progressively in metric selector 100. The eight bits representing the locations within the coded block of two suspect symbols for each candidate error pattern output from error pattern generator 90 address the particular stored metrics in selector 100. The thus selected metrics are output to an error pattern selector 110 via an output port 101.

Because of the delay associated with finding the least reliable symbol and retrieving the candidate error patterns, metric selector 100 must be able to store more than the sixteen metrics related to a single code block. A signal from control circuit 70 can be used to store and retrieve the metrics from the appropriate block. A designer of ordinary skill can therefore design selector 100 using a single long shift register or a plurality of shorter registers, switching appropriate inputs and outputs between them in response to control signals.

For each code block, error pattern selector 110 receives from metric selector 100 six bits representing two reliability metrics for each of the eight candidate error patterns in addition to the metric of the least reliable symbol from output 81. To determine the most likely valid code word, error pattern selector 110 needs to find the code word that is closest to the received symbol sequence. As previously mentioned, the 16-bit word that generates a non-zero syndrome is not a valid code word. The candidate error patterns identify combinations of symbols, the least significant bits of which could be changed to produce valid code words. The use of the metrics to determine the valid code word that is closest to the received symbol sequence can be more readily understood in conjunction with FIG. 5.

Figure 5:
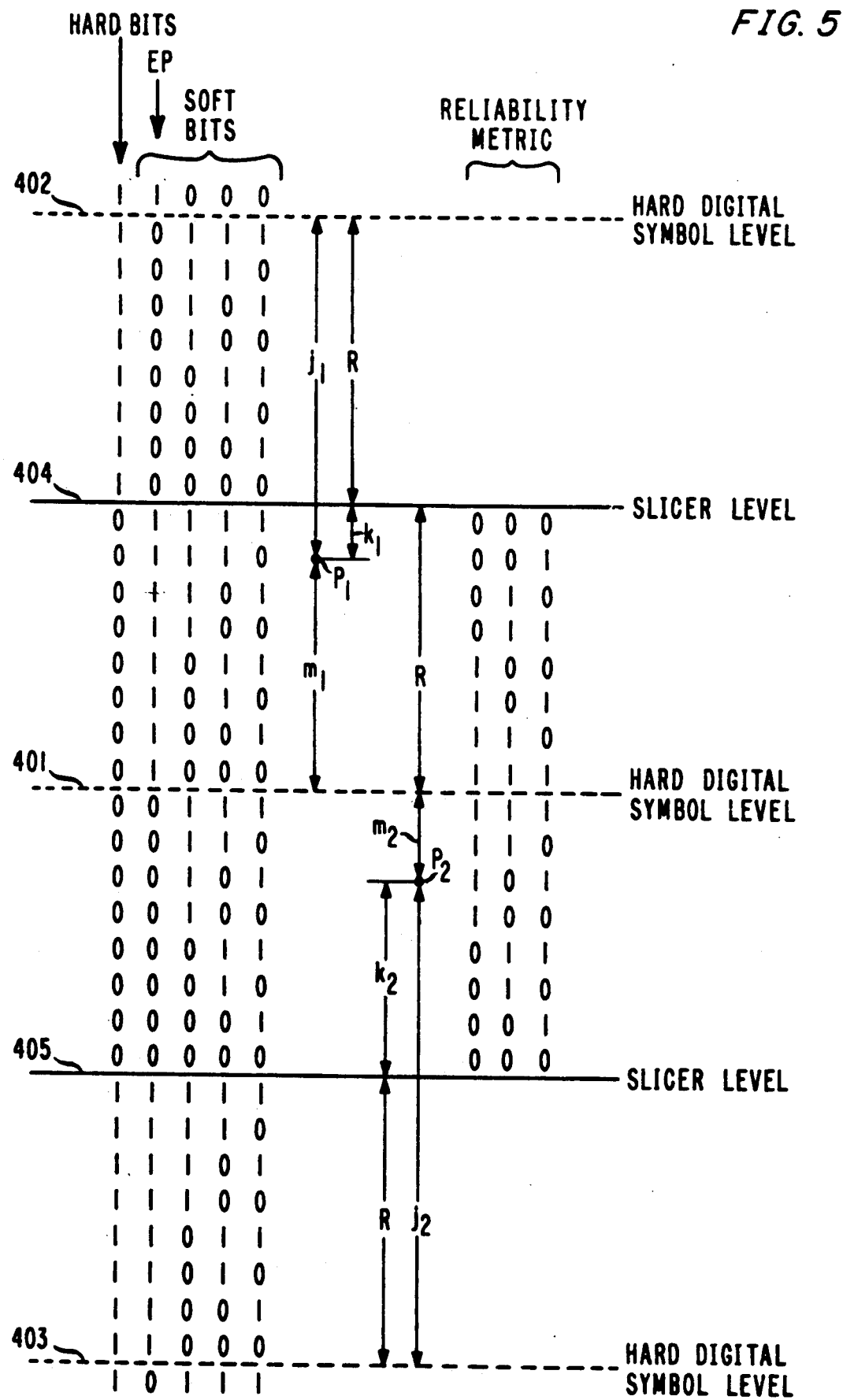
FIG. 5 is an analog-to-digital conversion diagram useful in explaining the operation of the invention.

FIG. 5 is a diagram of the translation of received analog symbol amplitudes into the digital output of the A/D converters. Hard digital symbol levels are shown by dotted lines 401–403, respectively, and slicer levels by solid lines 404 and 405. Consider two representative symbols received at level $P_1$, between hard digital symbol level 401 and slicer level 404, and $P_2$ between level 401 and slicer level 405, respectively. The least significant hard bit output for each of these received symbols is 0; the corresponding soft bits are 1110 for $P_1$ and 0101 for $P_2$. The euclidean distance between the received symbol and the closest hard bit output may be represented by $m_1$, and $m_2$, respectively. The distance from the next closest hard bit output therefore become $j_1$, and $j_2$. The euclidean distance between the received symbol sequence and the hard bit output sequence is therefore $m_1+m_2+\ldots+m_{16}$. This is always the shortest distance to a potential code word.

In considering error pattern candidates in order to find the closest valid code word, we note that the contribution $m_n$ for unchanged symbols remains the same. We need only consider, therefore, the difference between the current distance $m_n$ and the distance $j_n$ to the next closest hard bit for each symbol identified in a candidate error pattern, and pick the minimum sum. It will be noted that each $j_n$ is the sum of R, which is one half the slicer interval, plus $k_n$, the distance between the nearest slicer level and the received symbol level. Similarly $m_n = R - k_n$. The sum of the j distances minus the m distances of all of the errors of a candidate error pattern, therefore, $\Sigma(j_n - m_n) = \Sigma(R + k_n - [R - k_n]) = \Sigma 2k_n$. In finding the closest valid code word, therefore, the error pattern selector need only find the smallest sum of the k distances for the symbols of the candidate error patterns in each block.

It will be further noted that when the most significant soft bit, that is, the error polarity (EP) bit is zero, the three remaining soft bits are a binary equivalent of the distance k minus an error of one half the least significant bit between 000 and the slicer level. When the EP bit is a one, inverting each of the remaining soft bits produces the same result. That therefore is how the reliability metrics are formed in metric generator 50 that are retrieved from metric selector 100.

In order to effectively implement our error correction algorithm, error pattern selector 110 must be able to distinguish between single, double, and triple error patterns. For that purpose it may receive the last syndrome bit, $S_5$, properly delayed by delay 130 to coincide with the receipt of the corresponding metrics. When $S_5$ is a zero, indicating only double error patterns, the retrieved two metrics for each candidate pattern are binary summed. To find the minimum sum, each new sum may be compared to the previous sum and the lower sum saved for the next comparison. The location within the eight patterns per block is exported to errored symbols identifier 120. The one half level error enters equally into each sum comparison and may be ignored without effect.

When $S_5$ is a 1, one single and seven triple error patterns are candidates. As previously stated, however, the single error pattern may be the first stored and retrieved. The corresponding single 3-bit metric is used as the appropriate sum. For the remaining seven candidate error patterns, the appropriate sum includes the two retrieved 3-bit metrics, plus the metric of the least reliable symbol, appropriately delayed from least reliable symbol locator 80. Since the single-error sum includes only one-half level error, and each triple-error sum includes three one-half level errors, an additional one may be added to each triple-error sum for greater accuracy in selecting the error pattern for the closest valid code word. When the least reliable symbol is also identified as a candidate single error pattern, its metric taken once will be lower than the same metric taken three times; hence it will be chosen as the single error for correction. Again, the 3-bit location among the eight candidates is exported to identifier 120.

Errored symbols identifier 120 may be a look-up table similar to that of error pattern generator 90. In this case, however, in addition to the five syndrome bits and the four least-reliable-symbol-location bits (appropriately delayed by delay 130) the three bits out of error pattern selector 110 form an address. Stored at each address are eight 2-bit words that are successively output to a symbol corrector 140. Delay 42 delays the eight hard bits and two EP bits of each received baud to coincide at symbol corrector 140 with the corresponding 2-bit word from errored symbols identifier 120. The 2-bit word expresses whether to change the symbol on the I rail, the Q rail, neither, or both. For all addresses of the all-zero syndrome, therefore, all 2-bit words indicate changing neither symbol.

Symbol corrector 140 changes not only the least significant hard bits to produce the closes valid code word, but the entire appropriate 4-bit symbols. This allows the code of only 16 bits with an overhead of only 5 bits to correct the entire block of 64 bits. The EP bits indicate whether the corrected symbol is adjacently higher or lower than that received. The corrected symbols may be output on I and Q rails for appropriate processing in block decoder 150 to form the corrected output data stream.

Decoder 150 must remove the five check bits from the block of sixteen symbols and reconstruct the data stream of fifty-nine bits, performing the inverse of the encoder of FIG. 2.

We have thus described an error correcting data transmission system capable of transmission improvement equivalent to 3 dB at 200 Mb/sec.

The skilled designer will recognize that the 256 QAM embodiment described can be implemented in many ways, including the use of hard logic and/or programmed microprocessors. Likewise, since the QAM modulation format separates the signal into separate rails in the digital stage at both transmitter and receiver, separate encoders and decoders for each rail can be used within the contemplation of the invention. In such an embodiment that may use the Hamming (16,11) code, for example a code block could be made up of sixteen 4-bit bauds, and symbol location words could still comprise four bits. Since all inputs, outputs and processes are described for each function, ordinary skill is all that is needed to implement the invention.

It will also be recognized that embodiments using block codes other than the Hamming (16,11) and/or other transmission formats than 256 QAM can be built and operated without departing from the spirit or scope of the invention.

We claim:

1. Apparatus for correcting block coded data received in the form of discrete symbols that may incorporate one or more errors comprising:
   analog-to-digital converting means (20) for converting said received symbols into hard bits corresponding to the received data and soft bits indicative of the proximity of said received symbol values to valid symbol values;
   syndrome calculating means (60) responsive to said hard bits for calculating the syndrome of each received coded block;
   reliability metric generating means (50) responsive to said soft bits for generating a reliability metric for each received symbol;
   error pattern candidate retrieving means (90) responsive to said syndrome for identifying a plurality of error pattern candidates, each such candidate comprising one or more symbols for correction to produce a valid symbol block; and
   error correcting means (100, 110, 120, 140) responsive to said error pattern candidates and said reliability metrics for correcting the symbols of one of said identified error pattern candidates to produce the valid symbol block closest to the received symbol values characterized in that;
   said data is encoded according to a block code having an over-all parity bit;
   said apparatus further comprises:
   least reliable symbol identifying means (80) responsive to said reliability metrics for identifying the symbol in each coded block that is closest to a slicing level;
   in response to a non-zero even syndrome, said error pattern candidate retrieving means identifies the complete set of two-symbol errors that can produce the said even syndrome; and
   in response to an odd syndrome said error pattern candidate retrieving means identifies the one single-symbol error and the complete set of three-symbol errors, each including said least reliable symbol, that can produce the said odd syndrome.

2. Apparatus, as in claim 1, wherein said symbol in each block that is closest to a slicing level is the symbol with the lowest reliability metric.

3. Apparatus, as in claim 2, wherein said reliability metric comprises the remaining less reliable soft bits when the most reliable soft bit is zero and the remaining less reliable soft bits inverted when the most reliable soft bit is one.

4. Apparatus, as in claim 3, wherein said reliability metric comprises three bits.

5. Apparatus, as in claim 1, wherein said block code having an overall parity bit is the Hamming (16,11) code.

6. Apparatus, as in claim 1, wherein said error pattern candidate retrieving means (90) comprises first memory means addressed by said syndrome and by the location of said reliable symbol.

7. Apparatus, as in claim 6, wherein said first memory means has stored therein words representing the locations of two symbols.

8. Apparatus, as in claim 7, wherein the stored word that includes the location of a single error candidate is the first word output in response to an odd syndrome address.

9. Apparatus, as in claim 8, wherein the remaining words stored at addresses including an odd syndrome each represent the locations of of two symbols that, together with the least reliable symbol forming part of the address, comprise a triple-error pattern candidate.

10. Apparatus, as in claim 6, wherein said error correcting means comprises
   metric retrieving means (100) responsive to said error pattern candidates and said reliability metrics for retrieving the reliability metrics of the symbols in said error pattern candidates;
   error pattern selecting means (110) having metric combining means responsive to said retrieved metrics for generating a combined metric for each of said error pattern candidates, and comparing means responsive to said combined metrics for selecting one error pattern from said plurality of error pattern candidates; and
   symbol substituting means (120, 140) responsive to said error pattern selecting means and said hard bits for substituting symbols adjacent in value for the respective symbols in said one selected error pattern to produce the valid symbol block closest to said received symbol values.

11. Apparatus, as in claim 10, wherein said metric combining means sums the individual reliability metrics of the symbols within each error pattern candidate, to form said combined metric and said comparing means selects the error pattern candidate with the lowest combined metric.

12. Apparatus, as in claim 11, wherein the sum of said individual reliability metrics of the symbols within each triple error pattern candidate is increased by one to form the combined metric.

13. Apparatus, as in claim 11, wherein said symbol substituting means (120, 140) comprises
   third memory means (120) addressed by said syndrome, said location of said least reliable symbol and the location of said lowest combined metric, and having stored at addressable locations therein a plurality of words representative of whether symbols in corresponding bauds are included in said selected error pattern.

14. Apparatus, as in claim 10, wherein said metric retrieving means (100) comprises
   second memory means having stored therein the reliability metric for each symbol of said block
   at addresses representative of the respective locations within said block of the corresponding symbols.

15. Apparatus, as in claim 10, wherein said symbol substituting means (120, 140) is further responsive to the most significant of said soft bits (E.P.) to determine whether said substituted symbols adjacent in value are higher or lower than said received symbol values.

16. An error correcting digital transmission system for reliably transmitting a data signal between a first and a second location comprising transmitting means at said first location comprising encoding means (12) for encoding said data according to a block code having an over-all parity bit, and receiving means at said second location comprising data correcting apparatus (22) according to claim 1.

17. An error correcting digital transmission system according to claim 16 wherein said transmitting means further comprises digital-to-analog converting means (14) for converting multibit groups of said encoded data into corresponding discrete analog levels for transmission, and only the least significant bit of each multibit group is encoded according to said block code.

18. An error correcting transmission system according to claim 17 wherein said data is transmitted in a 256 QAM format.

19. An error correcting transmission system according to claim 18 wherein said transmitting means comprises separate encoding means for each digital rail and said receiving means comprising separate data correcting apparatus for each digital rail.

20. The method of correcting block coded data received in the form of pulses representative of transmitted symbols which may contain one or more errors comprising the steps of:

1. converting said received pulses into hard bits corresponding to received symbols and soft bits indicative of the proximity of the received pulse amplitudes to theoretical pulse amplitudes;
   2. calculating the syndrome of the received data block from said hard bits;
   3. generating a reliability metric for each received symbol from said soft bits;
   4. finding the least reliable symbol within said received data block by comparing said reliability metrics;
   5. generating for each non zero even syndrome a first plurality of error pattern candidates, each of which identifies two symbols which both could be changed to produce a valid symbol block;
   6. generating for each odd syndrome a second plurality of error pattern candidates, one of said second plurality of error pattern candidates identifying a single symbol which could be changed to produce a valid symbol block, the remainder of said second plurality of error pattern candidates identifying two symbols which could be changed together with said least reliable symbol to produce a valid symbol block;
   7. calculating a combined metric from the reliability metrics of the said identified symbols for each generated error pattern candidate;
   8. comparing the said combined metrics; and
   9. changing the said identified symbols of the error pattern candidate which according to its said combined metric yields the valid code word closest to the received symbol values.

* * * * *